F. W. DAVIS.
DIFFERENTIAL GEAR.
APPLICATION FILED JAN. 25, 1918.

1,389,580.

Patented Sept. 6, 1921.
2 SHEETS—SHEET 1.

INVENTOR.
Francis W. Davis.
by Wilhelm & Parker
ATTORNEYS.

F. W. DAVIS.
DIFFERENTIAL GEAR.
APPLICATION FILED JAN. 25, 1918.

1,389,580.

Patented Sept. 6, 1921.
2 SHEETS—SHEET 2.

INVENTOR.
Francis W. Davis,
by Wilhelm Parker.
ATTORNEYS.

UNITED STATES PATENT OFFICE.

FRANCIS W. DAVIS, OF BUFFALO, NEW YORK.

DIFFERENTIAL GEAR.

1,389,580.

Specification of Letters Patent.

Patented Sept. 6, 1921.

Application filed January 25, 1918. Serial No. 213,629.

*To all whom it may concern:*

Be it known that I, FRANCIS W. DAVIS, citizen of the United States, residing at Buffalo, in the county of Erie and State of New York, have invented a new and useful Improvement in Differential Gears, of which the following is a specification.

This invention relates to differential gears of the kind that are employed in motor vehicles between the source of power of the vehicle and the driving ground wheels, for the purpose of permitting the opposite wheels to turn at differential speeds when the vehicle is moving in other than a straight course. On account of this possible differential rotation of the driving ground wheels, these gears have certain disadvantages in use when the traction on the wheels is not the same. They tend to cause the vehicle to skid when one wheel loses traction and make it difficult to get the vehicle out of a bad place in the roadway on account of the loss of traction of one or the other of the driving wheels.

The object of the invention is to provide efficient and practical means for overcoming such disadvantages in differential gears and whereby the differential gear will permit the limited relative rotation of the driving ground wheels necessary for the proper operation of the vehicle, but will resist the differential rotation thereof when one of the wheels loses traction and tends to cause an increased difference in the rotation of the two wheels.

This object is attained by utilizing the differential motion of parts of the differential gear to pump or propel a liquid, preferably the oil employed for lubricating the gear, in such a manner that the resistance to the motion of the liquid increases with an increase in the relative motion of said parts of the gear and therefore prevents any considerable differential motion of the parts of the gear. In the constructions illustrated in the drawings and hereinafter described the gear wheels of the differential gear are housed or incased so as to cause the intermeshing gears to form rotary gear pumps which draw oil from the surrounding gear casing and force the same through restricted passages or openings of suitable size to offer resistance to any considerable flow of oil. The resistance to the flow of oil increases proportionally to the square of the speed of the pump gears, in accordance with the well known law of the flow of liquids. Consequently, for the ordinary differential action of the gear, as when the vehicle is turning corners and in other cases where the driving wheels rotate at only slightly different speeds, the resistance to the rotation of the gears forming the pumps will be very small because the outlet openings will be sufficiently large to allow an almost free discharge of the oil at low rotative speeds. However, when one driving wheel loses traction as by revolving on a slippery or soft surface, the speed of rotation of the differential gears will increase and will pump a larger volume of oil. The small outlet openings will then restrict the flow of oil to such an extent as to introduce a substantial resistance torque which will be transmitted to the driving wheel which has not lost traction. Thus the tendency of the vehicle to skid is greatly reduced and the ability to move the vehicle over bad ground is correspondingly increased. While the utilization of the intermeshing gear wheels of the differential gearing as pumps for the oil is deemed to be the preferable way of carrying out the invention, the relative motion of parts of the differential gear can be utilized through other instrumentalities for producing the described hydraulic resistance action. The invention is not, therefore, restricted to the use of the differential gear wheels as rotary pumps.

In the accompanying drawings:—

Figure 1:
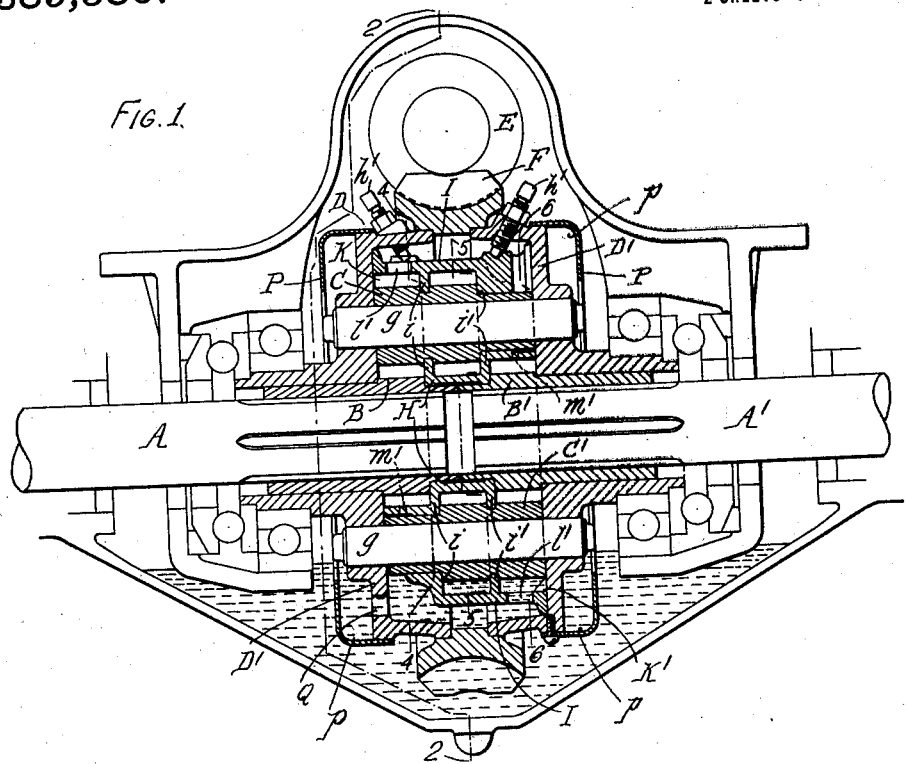
Figure 1 is a fragmentary longitudinal sectional elevation of the rear axle of a motor vehicle provided with a differential gear embodying the invention.
Figure 2:
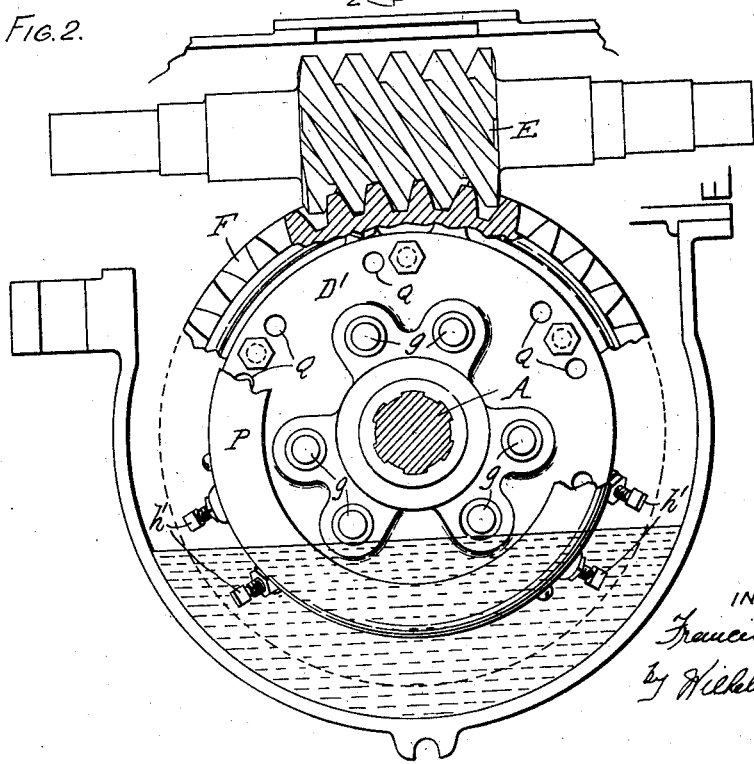
Fig. 2 is a transverse sectional elevation thereof on line 2—2, Fig. 1.
Figure 3:
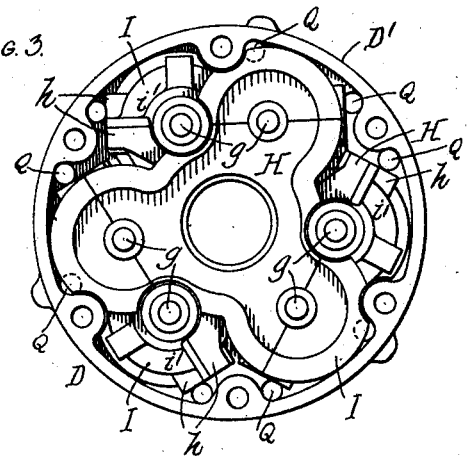
Fig. 3 is a view showing the differential gear in end elevation, one end of the gear casing being removed.
Figure 4:
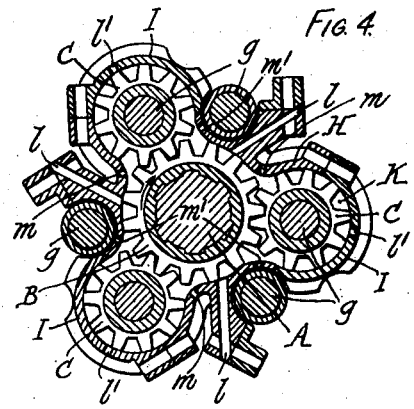
Figure 5:
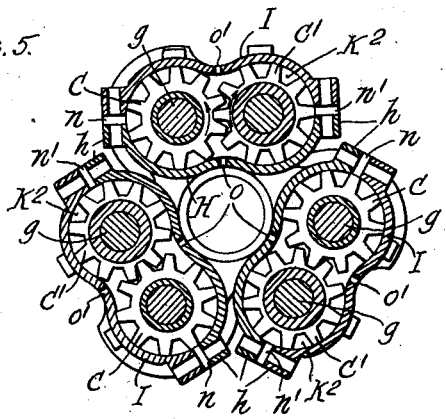
Figure 6:
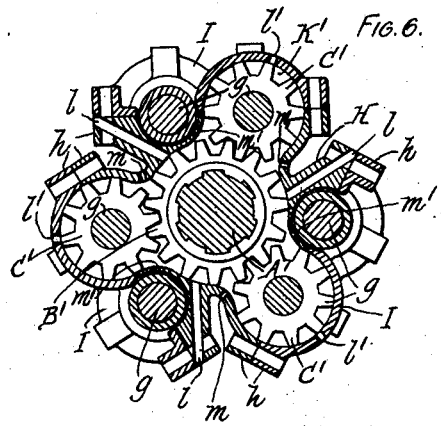

Figs. 4, 5 and 6 are transverse sectional elevations thereof on lines 4—4, 5—5 and 6—6, respectively, Fig. 1, showing respectively the left hand, central and right hand sets of the differential gears.

Figure 7:
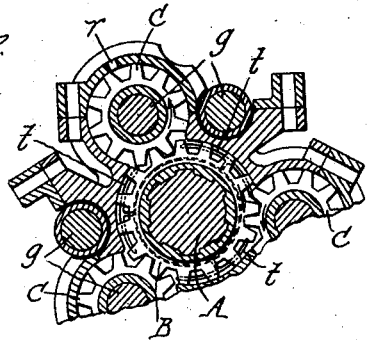
Figure 8:
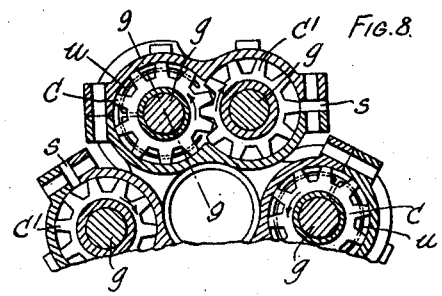

Figs. 7 and 8 are fragmentary sections similar respectively to Figs. 4 and 5, showing a slightly modified construction.

Figure 9:
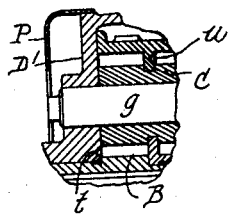

Fig. 9 is a fragmentary section on line 9—9, Fig. 8, and also showing a portion of the differential gear casing.

The invention is illustrated in the drawings in connection with a differential gear of known type, in which is employed planetary spur pinions arranged with their axes parallel with the axes of the divided shaft for the driving ground wheels. The invention is not, however, limited in application to differential gears of this construction. A A' represent the two shaft sections to the outer ends of which the driving or ground wheels of the vehicle are secured. To the inner ends of these shaft sections are secured spur gear wheels B B' respectively. C C' represent a pair of planetary spur pinions which are journaled parallel with the shaft sections A A' in a differential gear case D which is suitably journaled to revolve about the shaft sections A A' and the sun gear wheels B B'. The planetary pinions C C' mesh with each other as shown in Fig. 5, and one of these pinions, C, extends to the left beyond the other pinion and meshes with the left hand sun gear wheel B while the other pinion C' projects to the right beyond the pinion C and meshes with the other sun gear wheel B'. Three pairs of pinions C C' are shown arranged symmetrically around the sun gears, but any desired number of pairs, one or more, of these pinions may be used. The differential gear case D carrying the planetary pinions C C' is driven by suitable means, such as a worm E meshing with a worm wheel F secured to or formed with the gear case D. The gear case shown consists of oppositely arranged sections or ends D' D' which are bolted or otherwise suitably secured to and connected by a ring forming the worm wheel F. The pinions C C' are mounted on shafts g which are supported at their ends in bearing holes in the opposite ends of the differential gear case D. This differential gear operates in the usual well known manner, to turn the two sun wheels B B' and the shaft sections A A' secured thereto in the same direction at the same speed or to permit a differential rotation of the shaft sections A A' and the attached driving wheels.

Preferably, the several different sets of intermeshing gear wheels of the differential gearing are housed in or incased in such a manner that each pair of gears which mesh with each other forms a rotary gear pump. The pump housings or castings shown are formed by an inner casing part H which extends around the sun wheels B B' in the differential case D and partially incloses the same and the inner portions of the planetary pinion C C', and three removable caps or casing parts I which are suitably secured to the casing-part H, and each inclosing the outer portion of one pair of the planetary pinions C C'. The caps I and the casing part H are shown as provided with perforated lugs h adapted to receive bolts for securing the caps in place. h' indicates set screws passing through threaded holes in the gear case D and bearing against the ends of the caps I for forcing them into and holding them in tight contact with the casing part H. The casing parts H and I are formed with transverse partitions or walls i i'. The wall or partition i extends into a circumferential groove in the left hand pinion C and incloses the adjacent end of the right hand pinion C', and the wall or partition i' extends into a circumferential groove in the right hand pinion C' and incloses the adjacent end of the left hand pinion C. The casing parts H, I with the partitions i i' and the ends of the differential gear casing D thus form a left hand pump casing or chamber K, see Fig. 4, which incloses the sun wheel B and the left hand portions of the pinions C meshing therewith, a second pump casing or chamber K', see Fig. 6, inclosing the other sun gear wheel B' and the right hand portions of the pinions C' meshing therewith, and three intermediate pump chambers or casings K², see Fig. 5, each of which incloses the intermeshing portions of one pair of the planetary pinions C C'. In the construction shown in Figs. 1–6, the pump chamber K is provided with two oil admission openings $l\ l'$ for each of the pinions C and with two discharge or exit orifices or openings $m\ m'$ for each of the pinions C. The pump chamber K' is provided with similar oil admission openings $l\ l'$ and oil discharge or exit openings $m\ m'$. Each of the pump chambers K² is provided with two oil admission openings $n\ n'$ and two oil discharge or exit orifices $o\ o'$. Each pair of pinions C C' with the housings thus forms three rotary gear pumps, or nine pumps in all, as there are three pairs of the pinions C C'.

In order to insure a continuous supply of oil to the gear case D for the several pumps, flanged rings or shells P are preferably arranged on opposite ends of the gear case so as to form annular oil channels which dip into the oil in the oil reservoir formed by the axle casing. When the gear case D rotates the oil will be carried up in the channels p and will pass from the same into the gear case through suitable holes Q, Figs. 1 and 3, in the ends of the gear case.

In the use of the differential gear when there is any differential rotation between the sun wheels B and B', the pinions C C' will rotate about their own axes and the pumps formed by the intermediate gears will draw oil in through the admission openings $l\ l'$ and $n\ n'$ and discharge the same through the several oil exit orifices $m$ and $o$ or $m'$ and $o'$, depending upon the direction of rotation of the gears. For instance, if the sun gear wheel B rotates in a clockwise direction the oil will be discharged through the exit orifices m and o and if the gear wheel B is rotated in an anti-clockwise direction the oil will be discharged through the other exit orifices m' and o'. The resistance to the discharge of the oil through these orifices and to the relative rotation of the pump gears will increase with an increase in the differential rotation of the shaft A A' and the attached gear wheels B B', as before explained.

The construction shown in Figs. 7 to 9 is similar to that shown in the other figures of the drawings and above described except that only one oil inlet is provided for each pump instead of two and that the small oil exit orifices m m' and o o' are replaced by exit grooves. r and s indicate respectively the inlets for the left hand and central pumps and t and u indicate the exit grooves for the same pumps respectively. Three exit grooves t are formed in one end of the pump chamber inclosing the sun gear B and connect with the bearing opening for the shaft A and an exit groove u is formed in one end of the housing inclosing each pair of gears C C' and connects with the bearing opening for one of these gears. The inlets and the exit grooves for the pumps of the right hand set are arranged similarly to those of the left hand set. In the operation of the construction shown in Figs. 7 to 9, the oil is admitted through the inlets r and s and is carried around by the pinions C C' and enters the exit grooves t and u at one or the other end thereof, depending upon the direction of rotation of the gear wheels. This construction is desirable for the reason that the exit grooves are located so that the teeth of the gears sweep over them and act to clear the grooves of any foreign particles in the oil which may lodge in and tend to clog the grooves, and for the reason that the connection of the exit grooves with the bearings provides a forced feed lubrication for the bearings. Furthermore, with the exit groove arranged around one gear of each pump and the single inlet located at the far side of the other gear of the pump, the leakage of the oil around the gears is reduced and high pressures are insured.

I claim as my invention:—

1. The combination with driven members, and differential gear wheels connecting said members for producing differential motion thereof, of parts coöperating with said gear wheels to form a plurality of complete gear pumps actuated by the differential motion of said members to propel a liquid, whereby the resistance to said differential motion increases with an increase in said differential motion, all of said pumps operating to thus resist said differential motion in both directions of rotation of said driven members.

2. The combination with driven members, and differential mechanism connecting said members for producing differential motion thereof, of parts coöperating with said differential mechanism to form a plurality of complete pumps actuated by said differential mechanism and operating upon a difference in motion of said members to propel liquid through restricted exits whereby said liquid resists an increase in the differential motion of said members, all of said pumps operating to thus resist said differential motion in both directions of rotation of said driven members, and means for supplying liquid to said pumps.

3. In a differential gearing, the combination with intermeshing gears for producing differential rotation of driven members, of parts coöperating with said gears to form a plurality of complete pumps actuated by said intermeshing gears and operating upon a difference in rotation of said driven members to propel liquid through restricted exits, whereby said liquid resists an increase in the differential rotation of said driven members, and means for continuously supplying liquid to all of said pumps in the several different positions thereof.

4. In a differential gearing, the combination with intermeshing gears for producing differential rotation of driven members, of parts associated with said gears to form a plurality of pumps actuated by said intermeshing gears and operating upon a difference in rotation of said driven members to propel liquid through restricted exits, whereby said liquid resists an increase in the differential rotation of said driven members, and a rotary casing in which said differential mechanism is located and to and from which said pumps take and return the liquid, and means for supplying liquid to the several pumps in the different positions of said casing.

5. In a differential gearing, the combination with intermeshing gears for producing differential motion of two rotary members, of a pump chamber inclosing a pair of said intermeshing gears and providing liquid inlets and restricted liquid exits and forming with said gears a rotary gear pump, said inlets and exits being disposed to cause similar resisted pumping action of said pump regardless of the direction of rotation of said gears, and means for supplying liquid to said pump.

6. In a differential gearing, the combination with intermeshing gears for producing differential motion of two rotary members, of a pump chamber inclosing a pair of said intermeshing gears and forming with said gears a rotary gear pump, said casing having provision for the inlet and restricted exit of liquid when the gears rotate in one direction and provision for the inlet and exit of liquid when the gears rotate in the opposite direction, and means for supplying liquid to said pump.

7. In a differential gearing, the combination with intermeshing gears for producing differential motion of driven members, of a pump chamber inclosing a pair of said intermeshing gears and providing a liquid inlet and a liquid exit and forming with said gears a rotary gear pump, and means for continuously supplying liquid for said pump in the several different positions thereof, said exit being proportioned so that said liquid resists an increase in relative rotation of said intermeshing gears.

8. In a differential gearing, the combination with intermeshing gears for producing differential motion of driven members, of a pump chamber inclosing a pair of said intermeshing gears and providing a liquid inlet and a liquid exit and forming with said gears a rotary gear pump, and means for continuously supplying liquid for said pump in the several different positions thereof, said exit being proportioned so as to permit a relatively free discharge of the liquid at low relative rotations of said intermeshing gears and to resist the discharge of the liquid and oppose increased relative rotation of said intermeshing gears.

9. In a differential gearing, the combination with intermeshing gears for producing differential motion of driven members, of a pump chamber inclosing a pair of said intermeshing gears and providing a liquid inlet and a liquid exit and forming with said gears a rotary gear pump, a liquid reservoir from which said pump draws the liquid, and means for continuously supplying liquid from said reservoir to said pumps in the several different positions thereof, said exit being proportioned so as to increase the resistance to the movement of the liquid by the pump with an increase in the relative rotation of said intermeshing gears.

10. In a differential gearing, the combination with pairs of intermeshing gears for producing differential motion of driven members, of pump chambers inclosing the several pairs of intermeshing gears and providing liquid inlets and liquid exits and forming with said pairs of gears rotary gear pumps, means for continuously supplying liquid for said pumps in the several different positions thereof, said exits being proportioned so that said liquid resists an increase in relative rotation of said intermeshing gears.

11. In a differential gearing, the combination with intermeshing gears for producing differential rotation of driven members, of a pump actuated by said intermeshing gears and operating upon a difference in rotation of said driven members to propel liquid through a restricted exit, whereby said liquid resists an increase in the differential rotation of said driven members, a gear case for said differential mechanism which rotates therewith, a liquid reservoir in which said gear case rotates, said gear case having an opening therein to admit liquid from the reservoir into the gear case, and means for causing a continuous admission of liquid from said reservoir into said gear case.

12. In a differential gearing, the combination with intermeshing gears for producing differential rotation of driven members, of a pump actuated by said intermeshing gears and operating upon a difference in rotation of said driven members to propel liquid through a restricted exit, whereby said liquid resists an increase in the differential rotation of said driven members, a gear case for said differential mechanism which rotates therewith, a liquid reservoir in which said gear case rotates, and an annular liquid channel on said gear case which dips into the liquid in said reservoir for receiving the liquid, said gear case having an opening therein to admit liquid from said channel into the gear case.

13. In a differential gearing, the combination with intermeshing gears for producing differential motion of driven members, of a pump chamber inclosing a pair of said intermeshing gears, said pump chamber having a liquid inlet and having a liquid exit groove and forming with said gears a rotary gear pump, said exit groove being located so that it is swept by the teeth of one of said gears, and means for supplying liquid for said pump.

14. In a differential gearing, the combination with intermeshing gears for producing differential motion of driven members, of a pump chamber inclosing a pair of said intermeshing gears, said pump chamber having a liquid inlet and having a liquid exit groove and forming with said gears a rotary gear pump, said exit groove being located so that it is swept by the teeth of one of said gears and being connected with a bearing opening for said differential gearing whereby the liquid is discharged through said bearing opening, and means for supplying liquid for said pump.

Witness my hand this 22nd day of January, 1918.

FRANCIS W. DAVIS.

Witnesses:
M. J. PITMAN,
C. W. PARKER.

It is hereby certified that in Letters Patent No. 1,389,580, granted September 6, 1921, upon the application of Francis W. Davis, of Buffalo, New York, for an improvement in "Differential Gears," an error appears in the printed specification requiring correction as follows: Page 3, line 130, claim 6, before the word "exit" insert the word *restricted;* and that the said Letters Patent should be read with this correction therein that the same may conform to the record of the case in the Patent Office.

Signed and sealed this 18th day of October, A. D., 1921.

[SEAL.]

KARL FENNING,
*Acting Commissioner of Patents.*